United States Patent Office 3,443,889
Patented May 13, 1969

3,443,889
METHOD OF SYNTHESIS OF ALKALI METAL SALTS
Warren E. Clifford, San Francisco, Calif., assignor to Kaiser Aluminum & Chemical Corporation, Oakland, Calif., a corporation of Delaware
No Drawing. Filed Aug. 17, 1964, Ser. No. 390,230
Int. Cl. C01d 7/16, 7/28
U.S. Cl. 23—64                                 12 Claims This invention is concerned with a method for preparing any of a large variety of compounds. In particular, it is concerned with a method for preparing metal salts by reaction of a chloride of the metal with an acid in the presence of water and a water immiscible organic liquid phase containing an alkyl amine.

According to the process of the present invention, the reactants are contacted in an aqueous phase in the presence of a water immiscible amine. Hydrogen ions and chloride ions are selectively removed from the mixture by the amine. The overall equation for the reaction may be depicted in a general manner as follows:

$$MCl + HY = MY + HCl$$

wherein M stands for a metallic cation and Y stands for the anion of an acid. The term metal is used to include the $NH_4^+$ cation which is well known to resemble the alkali metal cations. The above equation is simply a summary of what happens in the overall process, and is not to be interpreted as a picture of the actual mechanism. The equation is supplied only for purposes of simplification.

The prior art contains instances wherein it has been attempted to carry out reactions of this sort. The process of the present invention, however, differs from any disclosure in the prior art in that important features found in the present invention are lacking in the disclosure of the prior art. The present invention comprises the discovery that such reactions may be operated successfully by carrying them out in the presence of a substantially water immiscible organic liquid phase containing an amine while maintaining said phase in intimate contact with the other reactants by means of agitation. To the best of our knowledge this method has never before been disclosed in the prior art. It is a particular advantage of the present invention that the process may be conducted in a continuous fashion, by regenerating the amine from its hydrochloride by treating it with an alkaline reagent and recycling it back to contact with reactants.

The present invention is applicable to making any of a wide variety of desired products. For example, potassium chloride is reacted with carbonic acid (carbon dioxide and water) to produce potassium bicarbonate. In similar fashion sodium bicarbonate is produced from sodium chloride and carbonic acid. $K_2HPO_4$ is produced from KCl and $H_3PO_4$ or $KH_2PO_4$. In like manner other phosphate salts are produced from other phosphoric acids.

The amines used in the present invention are substantially water immiscible. The amines which give particularly good results are primary branched chain amines having from 8 to 22 carbon atoms. The preferred amines are alkyl amines. The word alkyl is used here to include aralkyl. On an overall basis particularly outstanding result have been obtained using a mixture of amines of the formula $t-C_{12}H_{25}NH_2$ to $t-C_{14}H_{29}NH_2$. This material is commerically available from Rohm and Haas under the trade name Primene 81–R.

In many reactions, it has been found desirable to dissolve the amine in an inert substantially water immiscible solvent. Solvents useful for this purpose include aliphatic petroleum solvents such as Shell Deodorized Spray Base, aromatic petroleum solvents such as Amsco Solvent F or Amsco Solvent HW, xylene, and nitrobenzene.

During the reaction, intimate contact is maintained between the phases. No particular method of maintaining this contact is required as long as there is sufficiently intimate contact. In general, vigorous stirring is sufficient. Alternatively, a countercurrent flow may be established. All such methods are included within the general term "agitation."

It is a particular advantage of the present invention that following the reaction the liquid organic phase containing the amine (some of which is now in the form of the hydrochloride) readily separates spontaneously from the aqueous phase. This separation may be allowed to take place under the influence of gravity, or it may be speeded up and assisted by means of a centrifuge or a liquid cyclone. The free amine is readily recovered from the hydrochloride of the amine by treatment with an alkaline reagent. Lime, i.e., either calcium oxide or calcium hydroxide, is the preferred alkaline reagent.

The desired metal salt is also readily recovered by standard methods, the exact nature of which will depend upon the particular salt being prepared. For eample, $NaHCO_3$ and $KHCO_3$ are present at the end of the reaction as solids, and they are recovered by simple filtration, decantation or the like. $K_2HPO_4$ is present at the end of the reaction dissolved in water, and it is readily recovered in the dry state by evaporation of the water, or may be used in solution when so desired.

When reference is made to an aqueous phase in this application, it is intended to include but not be limited to systems where only a trace of water is present. Particularly in the cases of making $KHCO_3$ or $K_2HPO_4$ from potassium chloride, it is preferred that the aqueous solution be a saturated one and that undissolved solid KCl also be present.

The term acid is used in this application to mean a material which when dissolved in water yields hydrogen ions. This includes such well known acids as carbonic, phosphoric, acetic and the like, and also ions such as $H_2PO_4^-$, which ionizes further to yield a hydrogen ion.

The following examples are given only for the purpose of illustration and they are not to be considered limitations of the present invention, many variations of which will occur to those skilled in the art wihtout departing from either the spirit or the scope of the invention.

In the examples percent concentrations are by volume.
Primene 81R is $t-C_{12}H_{25}NH_2$ to $t-C_{14}H_{29}NH_2$, molecular weight 185–213, neutral equivalent 191.
Primene JMT is $t-C_{18}H_{37}NH_2$ to $t-C_{22}H_{45}NH_2$, molecular weight 269–325, neutral equivalent 315.

Example I.—Production of $KHCO_3$

One volume of saturated KCl-saturated $KHCO_3$, 1.33 gram moles of solid KCl per liter of organic phase, and 3.33 volumes of 50% Primene 81–R in nitrobenzene were thoroughly agitated with 6 p.s.i.a. $CO_2$ at 25° C. for 20 minutes. Analyses of the final organic phase indicated 100% conversion of KCl to $KHCO_3$. Analysis of the centrifuged and blotted solid gave a 10 to 1 mole ratio of $KHCO_3$ to KCl, including the retained mother liquor (which comprised 20% of the moist solid weight). Correction for the KCl and $KHCO_3$ contained in the mother liquor (saturated KCl-saturated $KHCO_3$) gives a 31 to 1 mole ratio of $KHCO_3$ to KCl on a dry solids basis. On a weight basis this is 97.6% $KHCO_3$. Upgrading this to at least 99% by leaching out solid KCl is readily accomplished.

Example II.—Production of $K_2HPO_4$

One volume of 10.4 M KCl (slurry) plus 5 M $H_3PO_4$ and five volumes of 50% (v./v.) Primene 81–R in xylene were mixed in three countercurrent stages. The organic phase effluent contained 2.0 M HCl and less than 0.01 M $H_3PO_4$, indicating over 99% of the $H_3PO_4$ had been converted to $K_2HPO_4$. Losses of Primene 81–R to the aqueous phase were less than .1%. Evaporation of the aqueous phase to dryness gave a product containing 96.7% $K_2HPO_4$ and 3.3% KCl by weight. The $K_2HPO_4$ purity was improved by evaporating to 6.9 M phosphate, cooling to 70° C., and separating out the crystallized KCl. In this way $K_2HPO_4$ of greater than 99% purity was produced. Three and a half volumes of organic phase were stripped with one volume of an aqueous slurry of $Ca(OH)_2$ in one stage to give a solution containing 3.5 M $CaCl_2$. The organic phase effluent contained less than .01 M HCl and was thus in condition for recycle.

Example III.—Production of $NaHCO_3$ (A) Two volumes of 5 M NaCl and one volume of 50% 2-ethylhexylamine in Amsco Solvent F where thoroughly mixed while passing in a stream of 100% $CO_2$ at room temperature and atmospheric pressure. After 20 minutes the organic phase contained 1.96 M HCl and .12 M $CO_2$. There was a substantial amount of solid $NaHCO_3$ formed in the aqueous phase. Both phases can be recycled as in previous examples.

(B) Two volumes of 5 M NaCl and one volume of 50% Primene 81-R in Amsco Solvent F (an aromatic solvent with an initial boiling point of 350° F.) were thoroughly mixed while passing a stream of $CO_2$ at 5 p.s.i.a. through the mixture at room temperature (70° F.). At the end of 20 minutes the organic phase contained 1.84 M HCl and .08 M $CO_2$. At this time a substantial quantity of solid $NaHCO_3$ was present at the bottom of the aqueous phase. The aqueous and organic phases were separated, the solid product removed from the aqueous phase, and additional NaCl added to the brine to bring it back up to approximately 5 M NaCl after which it is recycled. The HCl loaded organic phase was treated with a lime slurry —CaO— to regenerate the free amine solution for recycle, and an aqueous solution of $CaCl_2$.

(C) As above with 50% Primene 81-R in Shell Deodorized Spray Base (an aliphatic solvent having an initial boiling point of 376° F.). At the end of 20 minutes the organic phase contained 1.62 M HCl and .12 M $CO_2$ and at the end of 40 minutes, 1.89 M HCl and .06 M $CO_2$.

(D) As above with 50% Primene JMT in Amsco Solvent F. At the end of 20 minutes the organic phase contained 1.02 M HCl and 0.04 M $CO_2$ and at the end of 40 minutes, 1.12 M HCl and .04 M $CO_2$.

Example IV.—Production of $K_2CO_3$ (A) Equal volumes of 2.8 M $KHCO_3$ and 100% Primene 81-R were vigorously shaken for 30 minutes. At the end of that time the organic phase contained .57 M $CO_2$, indicating production of the same concentration of $K_2CO_3$ in the aqueous phase.

(B) Equal volumes of 1.7 M $KHCO_3$-1.6 M KCl and 100% Primene 81-R were shaken vigorously for 30 minutes. At the end of that time the organic phase contained .28 M $CO_2$ and .24 M HCl, indicating production of .52 M $K_2CO_3$ in the aqueous phase.

Example V.—Production of $K_3PO_4$

Equal volumes of 2 M $K_2HPO_4$-2.4 M KCl and 50% Primene 81-R in methylamylalcohol were vigorously shaken for 15 minutes. At the end of this time the organic phase contained .06 M HCl and a small amount of precipitate had formed in the aqueous phase.

Example VI.—$Na_2HPO_4$ production

One volume of 4.4 M NaCl-2 M $H_3PO_4$ and two volumes of 50% Primene 81-R in xylene were mixed in three countercurrent stages. Over 99% of the phosphate in the aqueous phase was converted to $Na_2HPO_4$, a large part of which crystallized from the solution as

$Na_2HPO_4 12H_2O$ at room temperature. The remaining liquor can be cooled to crystallize additional product or used directly as a recycle mother liquor by the addition of NaCl and $H_3PO_4$. The organic phase, containing 2 M HCl and negligible quantities of $H_3PO_4$ ($\leq$.01 M), can be treated with base—e.g. CaO or MgO—to regenerate the free amine solution for recycle.

Example VII.—$Na_2SO_4$ production

Equal volumes of 4.44 M NaCl-2 M $H_2SO_4$ and 100% Primene 81-R were mixed. The organic phase contained 2.83 M HCl and .28 M $H_2SO_4$.

Example VIII.—Aluminum hydroxide production

One volume of 1 M $AlCl_3$ and four volumes of 50% Primene JMT in Shell Deodorized Spray Base were mixed thoroughly for one hour, and the phases then allowed to separate. The aqueous phase contained a white precipitate of $Al(OH)_3$ and the organic phase contained .714 M HCl, indicating 95% removal of chloride from the aqueous phase.

Example IX.—$NaNO_3$ production

Equal volumes of 4.25 M. NaCl and 3.5 M $HNO_3$ and 100% Primene 81-R were mixed. The organic phase contained 1.15 M HCl and 2.01 M $HNO_3$.

Example X.—Sodium acetate production

One volume of 4 M NaCl-3.5 M acetic acid and two volumes of 50% Primene 81-R in Shell Deodorized Spray Base were thoroughly mixed for 15 minutes and then the phases were allowed to separate. The organic phase contained 1.20 M HCl and .56 M acetic acid, indicating 2.40 M Na acetate and 1.60 M NaCl in the aqueous phase.

Example XI.—Sodium sulfite production

Nine volumes of 2.78 M NaCl and 2.22 M $NaHSO_3$ and ten volumes of 50% Primene 81-R in Shell D.S.B. were thoroughly mixed for 15 minutes and then the phases were allowed to separate. The organic phase contained 1.02 M HCl and .10 M $H_2SO_3$. Therefore, the aqueous phase contained 1.65 M NaCl, 1.22 M $Na_2SO_3$, and .89 M $NaHSO_3$.

What is claimed is:

1. Process for preparing an alkali metal salt from an alkali metal chloride and an acid of the group consisting of carbonic, acetic, nitric, phosphoric, sulfuric and sulfurous acids comprising
    (a) preparing a water phase solution of said alkali metal chloride and admixing said water phase, said acid and a water-immiscible organic liquid phase consisting essentially of a water-immiscible, primary alkyl amine containing from 8 to 22 carbon atoms and a water-immiscible liquid organic solvent therefor,
    (b) extracting hydrogen ion and chloride ion into the organic phase by agitating the mixture to maintain intimate contact between the phases during the reaction.
    (c) separating the organic liquid phase containing the hydrochloride of the amine from the remainder of the mixture,
    (d) regenerating the amine from the hydrochloride of the amine by treating the organic liquid phase with an alkaline reagent,
    (e) recycling the organic liquid phase back to contact with replenished starting materials, and
    (f) separately recovering said remainder of said mixture and recovering said alkali metal salt therefrom.

2. A process as claimed in claim 1 wherein the alkaline reagent is lime.

3. A process as claimed in claim 1 wherein the amine is a primary branched chain alkyl amine containing from 8 to 22 carbon atoms.

4. A process for the manufacture of potassium bicarbonate comprising
    (a) contacting potassium chloride dissolved in an aqueous phase with carbon dioxide in the presence of a substantially water-immiscible organic liquid phase containing a substantially water-immiscible primary alkyl amine containing from 8 to 22 carbon atoms, (b) agitating the mixture to maintain intimate contact between the phases during a reaction, (c) separating the organic liquid phase containing the hydrochloride of the amine from the aqueous phase, (d) regenerating the amine from the hydrochloride of the amine by treating the organic liquid phase with an alkaline reagent, and (e) recycling amine back to contact with replenished starting materials, (f) and recovering potassium bicarbonate from said aqueous phase.

5. A process as claimed in claim 4 wherein the potassium chloride is present in the initial aqueous phase as a saturated solution in contact with undissolved solid potassium chloride.

6. A process for the manufacture of potassium bicarbonate comprising:

(a) contacting carbon dioxide with a saturated aqueous phase solution of potassium chloride containing undissolved solid potassium chloride in the presence of an organic liquid phase comprising a substantially water immiscible, inert, organic solvent and a primary, branched chain, alkyl amine containing from 2 to 22 carbon atoms, (b) agitating the mixture during the reaction to maintain intimate contact between the phases, (c) separating the organic liquid phase containing the hydrochloride of the amine from the remainder of the mixture including said aqueous phase, (d) regenerating the amine from the hydrochloride of the amine by treating the organic liquid phase with lime, and (e) recycling the organic liquid phase back to contact with replenished starting materials, (f) and recovering potassium bicarbonate from said aqueous phase.

7. In a process for the manufacture of sodium bicarbonate, the steps comprising (a) contacting sodium chloride dissolved in an aqueous phase with carbon dioxide in the presence of a substantially water-immiscible organic liquid phase containing a substantially water-immiscible primary, alkyl amine containing from 8 to 22 carbon atoms, (b) agitating the mixture to obtain intimate contact between the phases during the reaction, (c) separating the organic liquid phase containing the hydrochloride of the amine from the remainder of the admixture, (d) regenerating the amine from the hydrochloride of the amine by treating the organic liquid phase with an alkaline reagent, (e) recycling the organic liquid phase back to contact with replenished starting materials, (f) and separately recovering said remainder of said mixture containing said sodium bicarbonate.

8. A process as claimed in claim 7 wherein the sodium chloride is present in the aqueous phase as a saturated solution.

9. In a process for the manufacture of sodium bicarbonate the steps comprising:

(a) contacting carbon dioxide with a saturated aqueous phase solution of sodium chloride in the presence of an organic liquid phase comprising a substantially water immiscible, inert, organic solvent and a primary, branched chain, alkyl amine containing from 8 to 22 carbon atoms, (b) agitating the mixture during the reaction to maintain intimate contact between the phases, (c) separating the organic liquid phase containing the hydrochloride of the amine from the remainder of the mixture, (d) regenerating the amine from the hydrochloride of the amine by treating the organic liquid phase with lime, (e) recycling the organic liquid phase back to contact with replenished starting materials, (f) and separately recovering said remainder of said mixture containing said sodium bicarbonate.

10. A process for the manufacture of $K_2HPO_4$ comprising:

(a) contacting potassium chloride dissolved in an aqueous phase with phosphoric acid in the presence of a substantially water-immiscible organic liquid containing a substantially water-immiscible primary alkyl amine containing from 8 to 22 carbon atoms, (b) agitating the mixture to maintain intimate contact between the phases during the reaction, (c) separating the organic liquid phase containing the hydrochloride of the amine from the remainder of the mixture, (d) regenerating the amine from the hydrochloride of the amine by treating the organic liquid phase with an alkaline reagent, and (e) recycling organic liquid phase back to contact with replenished starting materials, (f) and recovering $K_2HPO_4$ from said aqueous phase.

11. A process as claimed in claim 10 wherein the potassium chloride is present in the aqueous phase as a saturated solution in contact with undissolved solid potassium chloride.

12. A process for the manufacture of $K_2HPO_4$ comprising:

(a) contacting phosphoric acid with a saturated aqueous phase solution of potassium chloride containing undissolved solid potassium chloride in the presence of an organic liquid phase comprising a substantially water immiscible, inert, organic, solvent and a primary, branched chain, alkyl amine containing from 8 to 22 carbon atoms.

(b) agitating the mixture during the reaction to maintain intimate contact between the phases, (c) separating the organic liquid phase containing the hydrochloride of the amine from the remainder of the mixture, (d) regenerating the amine from the hydrochloride of the amine by treating the organic liquid phase with lime, and (e) recycling the organic liquid phase back to contact with replenished starting materials, (f) and recovering $K_2HPO_4$ from said aqueous phase.

References Cited

UNITED STATES PATENTS

| | | | |
|---|---|---|---|
| 2,782,093 | 2/1957 | Hulot et al. | 23—64 |
| 2,837,404 | 6/1958 | Follows | 23—64 X |
| 2,900,223 | 8/1959 | Cunningham | 23—63 |
| 3,111,379 | 11/1963 | Gancy et al. | 23—64 |
| 3,156,644 | 11/1964 | Kunin | 210—24 X |
| 3,189,409 | 6/1965 | Wolstein | 23—64 |
| 3,215,620 | 11/1965 | Dunning et al. | 210—21 |
| 2,543,658 | 2/1951 | Durant et al. | 23—64 |

FOREIGN PATENTS 638,465  4/1964  Belgium.

OTHER REFERENCES

Kunin (II), Industrial and Engineering Chemistry, "Ion Exchange in Chemical Synthesis," vol. 56, No. 1, January 1964, pp. 35–39.

OSCAR R. VERTIZ, *Primary Examiner.*

G. T. OZAKI, *Assistant Examiner.*

U.S. Cl. X.R.

23—63, 64, 102, 107, 121, 129, 143; 260—541